(12) United States Patent
Padmanabh et al.

(10) Patent No.: US 10,476,959 B2
(45) Date of Patent: Nov. 12, 2019

(54) CLOUD RESOURCE PROVISIONING USING BLUEPRINT CHAINING

(71) Applicant: ServiceNow, Inc., Santa Clara, CA (US)

(72) Inventors: Giri Padmanabh, Mountain View, CA (US); Ashok Madhavan, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/585,114

(22) Filed: May 2, 2017

(65) Prior Publication Data

US 2018/0324251 A1   Nov. 8, 2018

(51) Int. Cl.
*H04L 29/06* (2006.01)
*H04L 29/08* (2006.01)
*G06F 9/50* (2006.01)

(52) U.S. Cl.
CPC ........ *H04L 67/1097* (2013.01); *G06F 9/5072* (2013.01); *H04L 67/306* (2013.01); *H04L 67/42* (2013.01)

(58) Field of Classification Search
CPC .............................. H04L 67/306; H04L 67/42
See application file for complete search history.

(56) References Cited

U.S. PATENT DOCUMENTS

| | | | |
|---|---|---|---|
| 2011/0321033 A1 | 12/2011 | Kelkar et al. | |
| 2013/0346619 A1* | 12/2013 | Panuganty | H04L 41/12 709/226 |
| 2014/0075032 A1 | 3/2014 | Vasudevan et al. | |
| 2015/0032817 A1* | 1/2015 | Garg | H04L 67/10 709/204 |
| 2016/0283200 A1 | 9/2016 | Standley et al. | |

OTHER PUBLICATIONS

Oracle, "Enterprise Manager Cloud Administration Guide / 57 Introduction to Blueprints", Oracle.com, Oracle Enterprise Manager Cloud Control Documentation, 12c Release 5, Date Unknown, Downloaded Apr. 11, 2017, https://docs.oracle.com/cd/E24628_01/doc.121/e28814/blueprint.htm#EMCLO1910, 15 pp.

(Continued)

*Primary Examiner* — Adnan M Mirza
(74) *Attorney, Agent, or Firm* — Fletcher Yoder PC

(57) ABSTRACT

A system and method including organizing blueprints into a blueprint chain, the blueprint chain connecting the blueprints in an order, wherein a blueprint in the blueprint chain includes resources connected to form a schematic of a portion of an application, wherein a first resource of the blueprint is associated with a first provider and a second resource of the blueprint is associated with a second provider, identifying at least one cloud account suitable for provisioning the blueprint chain, wherein the at least one cloud account includes the first provider and the second provider, and generating an orchestration to provision an instance of the application, the orchestration including a plurality of provisioning steps based on the blueprint chain and a selected one of the at least one cloud account, wherein an ordering of the plurality of provisioning steps depends on the order of the blueprints in the blueprint chain.

20 Claims, 9 Drawing Sheets

(56) References Cited

OTHER PUBLICATIONS

AWS, "AWS CloudFormation", Amazon Web Services, Date Unknown, Downloaded Apr. 11, 2017, https://aws.amazon.com/cloudformation/, 5 pp.
Extended European Search Report for Application No. 18165066.4 dated Oct. 4, 2018, 7 pages.
Office Action in Canadian Application No. 2,999,662 dated Jan. 17, 2019; 4 pages.

* cited by examiner

CLOUD RESOURCE PROVISIONING USING BLUEPRINT CHAINING

BACKGROUND

Cloud computing relates to the sharing of computing resources that are typically accessed via the Internet. A cloud computing infrastructure can include a large number of computing devices that are configured to execute various programs, such as application servers, web servers, or database servers. Cloud computing resources, such as application, storage, and network resources be provisioned on one or more computing devices of the cloud computing infrastructure.

SUMMARY

Disclosed herein are implementations of systems and techniques for cloud resource provisioning using blueprint chaining.

According to an implementation, a method for provisioning resources in a distributed computing system is provided. The method includes organizing blueprints into a blueprint chain stored in computer-readable memory, the blueprint chain connecting the blueprints in an order, wherein a blueprint in the blueprint chain includes resources connected to form a schematic of a portion of an application, wherein a first resource of the blueprint is associated with a first provider and a second resource of the blueprint is associated with a second provider, identifying at least one cloud account suitable for provisioning the blueprint chain, wherein the at least one cloud account includes the first provider and the second provider; and generating, using a processor connected to the computer-readable memory, an orchestration to provision an instance of the application, the orchestration including a plurality of provisioning steps based on the blueprint chain and a selected one of the at least one cloud account, wherein an ordering of the plurality of provisioning steps depends on the order of the blueprints in the blueprint chain.

According to an implementation, a system for provisioning resources in a distributed computing system is provided. The system includes a processor and a memory and the memory includes instructions executable by the processor to organize blueprints into a blueprint chain, connect the blueprints in an order, wherein a blueprint in the blueprint chain includes resources connected to form a schematic of a portion of an application, wherein a first resource of the blueprint is associated with a first provider and a second resource of the blueprint is associated with a second provider, identify at least one cloud account suitable for provisioning the blueprint chain, wherein the at least one cloud account includes the first provider and the second provider, select one of the cloud accounts; and generate an orchestration to provision an instance of the application, the orchestration including a plurality of provisioning steps based on the blueprint chain and a selected one of the at least one cloud account, wherein an ordering of the plurality of provisioning steps depends on the order of the blueprints in the blueprint chain.

According to an implementation, a non-transitory computer-readable storage medium is provided that includes executable instructions that, when executed by a processor, facilitate performance of operations that include organizing blueprints into a blueprint chain stored in computer-readable memory, the blueprint chain connecting the blueprints in an order, wherein a blueprint in the blueprint chain includes resources connected to form a schematic of a portion of an application, wherein a first resource of the blueprint is associated with a first provider and a second resource of the blueprint is associated with a second provider, identifying at least one cloud account suitable for provisioning the blueprint chain, wherein the at least one cloud account includes the first provider and the second provider, and generating, using a processor connected to the computer-readable memory, an orchestration to provision an instance of the application, the orchestration including a plurality of provisioning steps based on the blueprint chain and a selected one of the at least one cloud account, wherein an ordering of the plurality of provisioning steps depends on the order of the blueprints in the blueprint chain.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
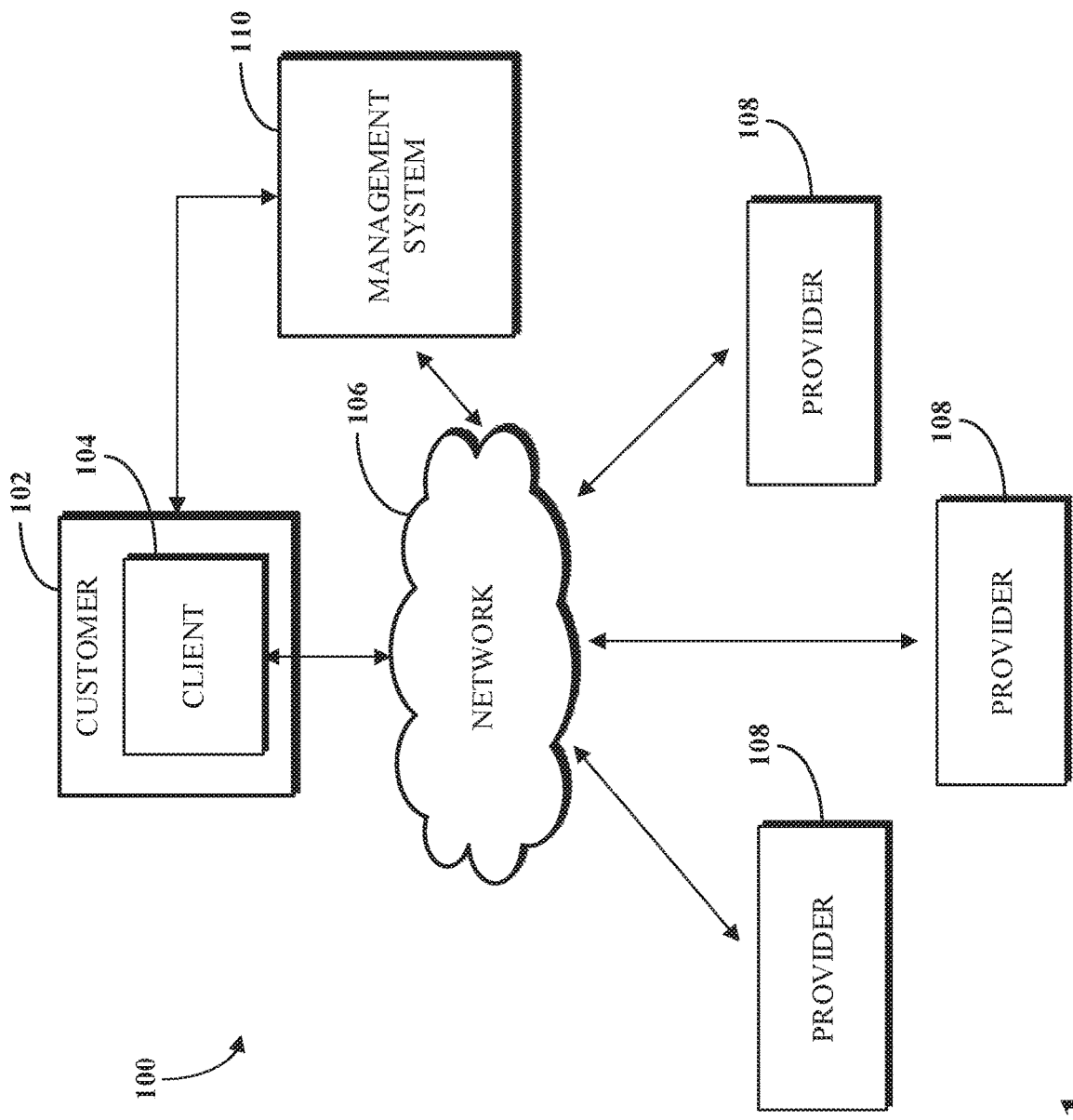
FIG. 1 is a block diagram of an example electronic computing and communications system.

In an electronic computing and communications system, a blueprint can provide a schematic that can be used to provision resources in a distributed computing system. For example, a blueprint can be used to create, configure, and connect network, storage, or computing resources at a provider of computing resources, such as a cloud computing provider. A blueprint can include a definition of how resources required to instantiate a software application are connected when the blueprint is provisioned. When a blueprint is provisioned, the associated resources included in the blueprint are provisioned. The provisioning of a blueprint can thus result in the provisioning of an instance of an application according to the blueprint. The blueprint can include one or more attributes associated with a resource. The one or more attributes can include network configuration, server requirements, memory requirements, one or more cloud service providers that the resource can be implemented on, or other suitable resource attributes. Resources associated with the blueprint can be provisioned on different cloud service providers that are associated with the blueprint according to the one or more attributes of the blueprint.

Using a single blueprint for the provisioning of an instance of an application including its associated resources to a cloud provider can lead to difficulties. For example, each application may have its own blueprint that may require periodic maintenance and updating. These blueprints may have common resources, such as network and storage resources that may be duplicative of each other. Because these resources may be recreated for each blueprint, there may exist variations in how they are defined in each blueprint, which may vary from a desired configuration.

Instead of using a single blueprint, multiple blueprints can be used to provision an instance of an application. For example: a network blueprint can provide network resources associated with the application; a storage blueprint can provide storage resources associated with the application; or a compute blueprint can provide compute resources associated with the application. There may, however be dependencies between resources provided in the different blueprints. For example, a storage resource may depend on a network resource. Thus, the blueprints dependent on the resources provided by other blueprints may need to be provisioned after those other blueprints and may require attributes (e.g., IP addresses) generated by the provisioning of another blueprint.

A blueprint chain can be configured to connect multiple related blueprints in a provisioning order. The provisioning order can include provisioning some of the multiple related blueprints serially and provisioning others of the multiple related blueprints in parallel. The individual blueprints in the blueprint chain may have provisioning steps that are followed to provision the resources included in the individual blueprints. For example, based on metadata associated with the resources, the provisioning steps may include interactions with one or more application programming interfaces of one or more cloud providers that cause the desired resources to be created and configured within a computing system of the cloud provider. Such interactions may result in the return of data from the application programming interface after the resource is provisioned to provide attributes about the provisioned resource (e.g., an IP address).

The blueprint chain can be configured to generate a set of blueprint chain attributes based on attributes associated with the multiple related blueprints. For example, a blueprint chain can be used to identify duplicative attributes associated with the multiple related blueprints. These duplicative attributes can indicate the presence of a dependency between the blueprints (e.g., if multiple blueprints in the chain have an attribute for IP address). The blueprint chain can connect the attributes of the blueprints together such that the output of certain attributes from a blueprint earlier in the chain can be used for an attribute of a blueprint later in the chain.

By using separate blueprints in a blueprint chain to provision cloud resources, a number of advantages may be realized. For example, the configuration of network and storage resources may require specialized expertise or may be configured in a particular way to improve the efficiency of operation of cloud computing instances. For example, it may be preferred to use a first cloud provider for a network resource and a second cloud provider for a storage resource. As a further example, it may be preferred to use one of a group of cloud providers for a particular resource. As a further example, it may be preferred to use certain attributes in a storage blueprint to reduce costs, comply with contractual obligations, such as service level agreements, or the like. By permitting separate interchangeable blueprints to provision certain resources of a cloud computing system, the configuration of the application to be provisioned may be better optimized and the time for creating the blueprint may be decreased (e.g., due to the reusability of certain blueprints in the chain). These benefits may be further expanded by permitting the individual blueprints to use different cloud providers. Also, because blueprints can be more easily reused, the reliability of provisioned cloud computing applications may be improved.

In order to facilitate the provisioning of blueprint chains that may use different cloud providers, cloud accounts can be defined that include multiple providers. For example, a cloud account can be defined that includes a first provider and a second provider account information, with attributes indicating the resources that can be provisioned to each provider. The available cloud accounts may be matched against the blueprint chain to determine which cloud accounts can be used when provisioning the blueprint chain. If more than one cloud account is usable to provision the blueprint chain, a choice of cloud accounts can be provided to a user or software that is requesting the provisioning of the blueprint chain.

To describe some implementations in greater detail, reference is first made to examples of hardware structures. FIG. 1 is a block diagram of an example of an electronic computing and communications system 100 in accordance with this disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or a combination of physical units. In some implementations, a single physical unit can include multiple clients.

In some implementations, the client 104 can be an instance of an application running on a customer device associated with the customer 102. The system 100 can include any number of customers or clients or can have a configuration of customers or clients different from that generally illustrated in FIG. 1. For example, the system 100 can include hundreds or thousands of customers and at least some of the customers can include or be associated with any number of clients. A customer can include a customer network or domain. For example, and without limitation, the client 104 can be associated or communicate with a customer network or domain.

In some implementations, the client 104 can be configured to connect to, or communicate with, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, use other communications technologies, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more providers 108, or a combination thereof.

A provider 108 can be configured to provide to the customer 102 one or more cloud computing services. For example, the provider 108 can provide infrastructure as a service, software as a service, platform as a service, other suitable cloud computing services, or a combination thereof. For example, provider 108 can include a cloud service provider which may provide databases, application servers, virtual servers, other software functionality, or a combination thereof. A provider 108 can include a computing system including one or more computing devices, such as a desktop computer, a server computer, other computing devices capable of providing cloud computing services, or a combination thereof. In some implementations, the customer 102 can utilize one or more providers 108 to store, manage, and process data associated with the customer 102. For example, the customer 102 can utilize cloud computing services associated with a first provider to store data and a second provider to process the data before or after storing the data with the first provider. In some implementations, the customer 102 can provision components used by an instance of a software application to one or more providers 108 using a blueprint chain.

The system 100 can include a management system 110. The management system 110 can be configured to receive a provisioning request from the customer 102. In some implementations, the client 104 can communicate a provisioning request to the management system 110. In other implementations, the customer 102 or the client 104 can communicate with the management system 110 via the network 106. The provisioning request can include a request to provision a blueprint chain.

The provisioning request can include information required to provision the software application. For example, the request can include an indication of a cloud account to be used when provisioning the blueprint chain. The cloud account may be stored on or accessible to the management system 110 and may include one or more providers and associated information about those providers, such as login information and permitted uses for each provider (e.g., whether the provider can be used for network, storage, compute, or other resources).

For example, the management system 110 can identify a first provider associated with the name of the cloud service provider the customer 102 has an account with. The management system 110 can communicate with the first provider via the network 106. The management system 110 can use provider login credentials associated with the customer 102. The management system 110 can be configured to provision the software application on the first provider 108. The customer 102 can communicate with the first provider via the network 106 to utilize the software application.

Figure 2:
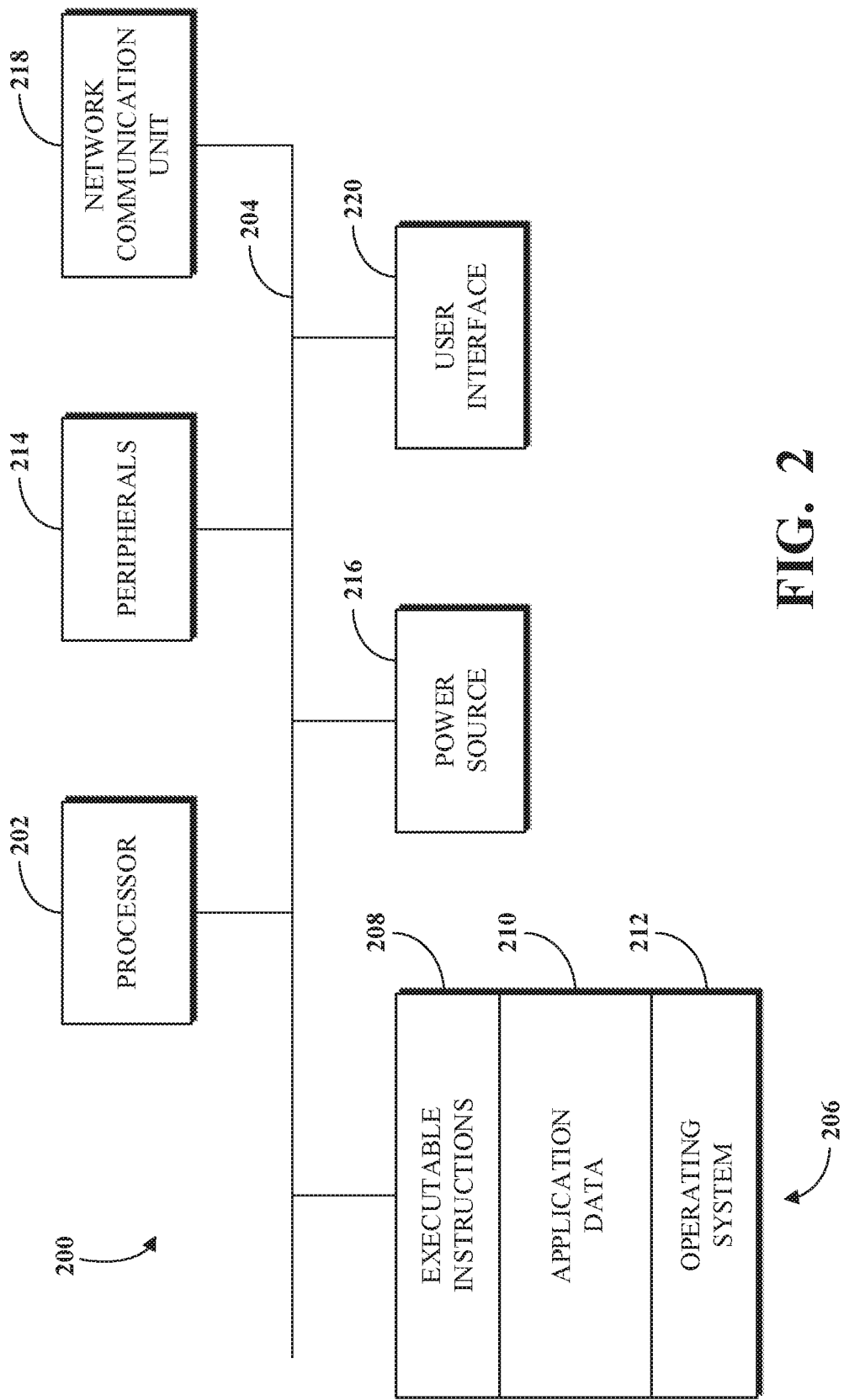
FIG. 2 is a block diagram of an implementation of an internal configuration of a computing device, such as a computing device of the cloud computing system as shown in FIG. 1.

FIG. 2 generally illustrates a block diagram of an example internal configuration of a computing device 200, such as a client 104 or a server, such as a server associated with a provider 108 or the management system 110, of the system 100 as generally illustrated in FIG. 1. A client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions. The operations of the processor 202 can be distributed across multiple clients or servers, which can be coupled directly or across a local area or other suitable type of network.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now-existing or hereafter developed, capable of storing data or instructions for processing by the processor 202. Although shown as a single block in FIG. 2, the memory 206 can be implemented as multiple units. For example, a computing device 200 can include volatile memory, such as RAM, and persistent memory, such as a hard drive or other storage. The processor 202 can access or manipulate data in the memory 206 via the bus 204. Although depicted here as a single bus, the bus 204 can be composed of multiple buses, which can be connected to one another through various bridges, controllers, or adapters.

The memory 206 can include executable instructions 208, data, such as application data 210, an operating system 212, or a combination thereof, for immediate access by the processor 202. The memory 206 can be distributed across multiple clients or servers, such as network-based memory or memory in multiple clients or servers performing the operations of clients or servers. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to provision one or more application blueprints or blueprint chains. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. In some implementations, a client or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, (e.g., an OLED display), or other suitable display.

Figure 3:
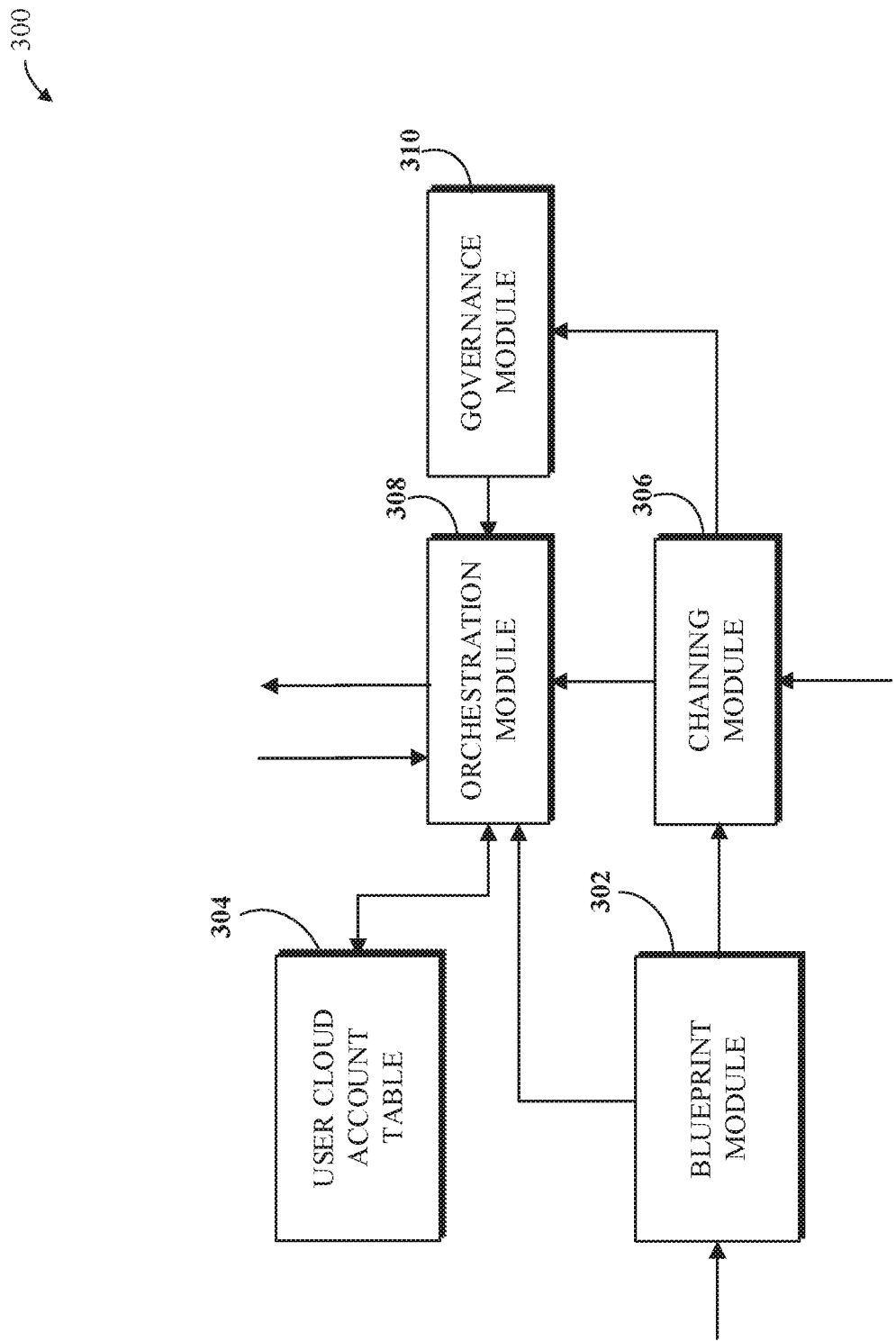
FIG. 3 is a block diagram of an example implementation of the management system as shown in FIG. 1.

FIG. 3 is a block diagram of an example implementation of a management system, such as the management system 110 as shown in FIG. 1. In some implementations, the system 110 can be configured to generate one or more blueprints based on input received from a user associated with a customer. The system 110 can be configured to organize multiple related blueprints into a blueprint chain. In some implementations, the system 110 can be configured to provision, in response to a request from a customer, a blueprint chain using one or more cloud service providers to provision an application. In some implementations, the system 110 can include a blueprint module 302.

The blueprint module 302 can be configured to generate blueprints based on input received from a user. For example, a graphical user interface can be provided to a user that permits resources to be dragged and dropped onto a blueprint canvas, connections to be made between the resources on the blueprint canvas, and editing of attributes of resources and connections on the blueprint canvas. The resources and connections between the resources can form a schematic of an application or a portion of an application to be provisioned using one or more cloud providers. One or more blueprint design forms can be provided by the user interface. The design forms can include data input fields, drop-down box selection fields, other suitable data collection fields, or a combination thereof. The user input can include the one or more resources required to provision the application, attributes associated with the one or more resources, connection information indicating how the one or more resources can be connected to each other, other suitable input for generating a blueprint, or a combination thereof.

The resources included in a blueprint can include a network resource, a storage resource, a web application (e.g., an Apache Web Server), a database application (e.g., a MySQL instance), other suitable resources required to provision an associated application, or a combination thereof. The attributes associated with a resource can include resource implementation instructions, resource implementation requirements, one or more cloud service providers that can be used to provision the resource, other suitable resource attributes, or a combination thereof. In some implementations, when a blueprint is provisioned, a cloud service provider associated with a resource can utilize the resource implementation instructions and resource implementation requirements to implement or instantiate the resource. For example, a series of provisioning steps can be carried out in an order to provision the resource. Each provisioning step can include a resource implementation instruction which may be used to interact with a cloud provider. The resource implementation requirements can include server requirements, memory requirements, computer processor requirements, disk space requirements, operating system requirements, virtual machine requirements, other suitable requirements for implementing a resource, or a combination thereof.

The blueprint module 302 can be configured to generate a deployment model based on the user input. For example, the blueprint module 302 can connect the one or more resources together according to the connection information. The connection information can include information identifying resources that can be connected in parallel (e.g., resources that can be implemented at the same or substantially the same time). The blueprint module 302 can connect the identified resources in parallel and can connect remaining resources in series. When the blueprint is provisioned, resources connected in parallel can be implemented at the same or substantially the same time and resources connected in series can be implemented serially (e.g., one after the other). For example, resources that do not depend on each other may be implemented in parallel and resources that have dependencies between them may be implemented in serial according to those dependencies.

In some implementations, the user input can include one or more attributes associated with a resource, which may vary according to cloud service provider. The one or more attributes can include a type of service to be provided by a cloud service provider (e.g., a storage service), one or more data security requirements, how a cloud service provider interoperates with other cloud service providers, other suitable attributes associated with the one or more cloud service providers, or a combination thereof. For example, a blueprint can be configured to provision a web server application. The attributes can indicate an ordering in which provisioning steps should be undertaken with respect to the blueprint or resource according to a particular provisioning operation. For example, a provisioning operation may include provisioning an application instance to one or more cloud providers or removing an application instance from one or more cloud providers. In these examples, an operation including removing an application may include performing provisioning steps in a reverse order. The user input can include a web server resource (e.g., an Apache instance), instructions for implementing the web server resource, a cloud service provider capable of implementing the web server, a type of cloud service (e.g., software as a service), other suitable resource attributes, or a combination thereof.

In some implementations, the blueprint module 302 can be configured to generate an orchestration definition associated with a blueprint. The orchestration definition can include a set of governance policies, a provisioning order, other suitable orchestration details, or a combination thereof. The blueprint can include connection information indicating how resources associated with a blueprint can be connected to each other (e.g., in parallel or in series). The blueprint module 302 can be configured to determine an order in which resources connected in parallel and in series can be implemented. For example, a blueprint can include a first, second, and third resource. The user input can include connection information that indicates that the first resource can be implemented in parallel with the third resource. Accordingly, the second resource can be implemented in series with other resources. The blueprint module 302 can determine, based on attributes associated with first, second, and third resources, whether the second resource can be implemented before the first and third resources or after the first and third resources. A set of provisioning steps can be generated with an associated ordering for the orchestration definition based on the connection information. There may be multiple alternative provisioning steps depending on the cloud provider used to provision the resources included in the blueprint.

The user input can include a set of governance polices for a blueprint. The governance policies can include blueprint operation policies, resource quota policies, resource operation policies, other suitable polices, or a combination thereof. The governance policies can govern the orchestration or provisioning of a blueprint. The blueprint module 302 can generate the orchestration definition based on the provisioning order and the governance policies. The blueprint module 302 can store a blueprint (e.g., including the associated deployment model and orchestration definition) in a database table. The database table can include a plurality of blueprints generated by the blueprint module 302 or by other suitable blueprint generation mechanisms.

In some implementations, a customer can use a blueprint to provision an application on one or more cloud service providers. The cloud-based application defined by the blueprint can be referred to as an application stack and the provisioned blueprint can result in an instance of the application stack. For example, an application stack instance can include a webserver instance, a storage server instance, and a network server instance provisioned using a blueprint. The application stack is a realization of the deployment model associated with a blueprint. When a customer a blueprint, the orchestration module 308 can be configured to execute an orchestration based on the orchestration definition of the blueprint. In some implementations, provisioning a blueprint can include sending instructions to a cloud service provider to install, instantiate, or provision resources associated with the blueprint.

In some implementations, the system 110 can include a user cloud account table 304. The user cloud account table 304 can include a relational database table. The user cloud account table 304 can include cloud account records representing provider accounts associated with the customer. A cloud account record includes information about cloud service providers that the customer has access to or an account with. For example, a cloud account record can indicate that the customer has a user account with Microsoft, Amazon, other suitable cloud service providers, or a combination thereof. In some implementations, a cloud account record can include one or more attributes associated with cloud service providers associated with the cloud account record. For example, the one or more attributes can include cloud account login credentials (e.g., a user name and a password for access a customer's account with a cloud service provider), cloud account resource restrictions, cloud account usage restrictions, a type of cloud computing service or capability type that the customer has access to on a cloud service provider, other suitable attributes associated with the cloud service providers, or a combination thereof.

A cloud account stored in cloud account table 304 may include information about more than one cloud provider and how the more than one cloud providers may be used together. For example, a cloud account can indicate that a first cloud provider may be used for network and storage resources and a second cloud provider may be used for compute resources. The cloud account may also include information usable by the orchestration module to permit the resources provisioned using the first cloud provider and the second cloud provider to interact in order to permit the provisioned application stack to function.

In some implementations, the system 110 can include an orchestration module 308. The orchestration module 308 can receive a request from a customer (e.g., the customer 102 as shown in FIG. 1) to provision a blueprint. The orchestration module 308 can retrieve the blueprint from the blueprint module 302 or from a memory used to store blueprints generated using blueprint module 302. In response to the request to provision the blueprint, the orchestration module 308 may retrieve cloud account records associated with the customer 102 from the user cloud account table 304.

The orchestration module 308 can be configured to determine whether the customer 102 can provision the blueprint. For example, the orchestration module 308 can determine whether the customer 102 has access to or an account with the one or more cloud service providers associated with the blueprint. As described above, the blueprint can include one or more resources. The blueprint can provide one or more cloud service providers capable of implementing an associated resource.

In some implementations, the blueprint can provide that one of a pre-defined set of cloud service providers can be utilized to provision the blueprint (e.g., a cloud service provider capable of implementing resources associated with the blueprint). The orchestration module 308 determines whether the customer 102 has access to or an account with the one of the pre-defined set of cloud service providers. For example, the orchestration module 308 can compare cloud service providers associated with the cloud account records with each of the pre-defined set of cloud service providers associated with the blueprint. When the orchestration module 308 determines that none of the cloud service providers associated with the cloud account records match any of the pre-defined set of cloud service providers, the orchestration module 308 can indicate to the customer 102, via a user interface, that the customer 102 cannot provision the blueprint. Alternatively, when the orchestration module 308 determines that a cloud service provider associated with at least one cloud account matches the single cloud service provider, the orchestration module 308 determines whether attributes associated with the at least one cloud account matches the attributes associated with the pre-defined set of cloud service providers. For example, the cloud account may limit the types of resources that can be provisioned using the cloud account.

When the orchestration module 308 determines the attributes do not match, the orchestration module 308 can indicate to the customer 102 that the customer 102 cannot provision the blueprint. Alternatively, when the orchestration module 308 determines the attributes match, the orchestration module 308 can be configured to provision the blueprint. For example, the orchestration module 308 can provision the blueprint using the cloud service provider associated with the at least one cloud account. The cloud service provider can be a provider 108 as shown in FIG. 1. As described above, a cloud account record can include login credentials associated with the cloud service provider. The orchestration module 308 can access the single cloud service provider based on the login credentials.

In some implementations, the blueprint can provide that the resources of the blueprint may be provisioned using one or more combinations of cloud providers. For example, the blueprint can provide that a first cloud service provider can be used to provision a subset of the resources associated with the blueprint and a second, different, cloud service provider can be used to provision other resources associated with the blueprint. The orchestration module 308 can determine whether there is a cloud account that includes at least one combination of cloud providers provided for by the blueprint. For example, the orchestration module 308 can determine whether there is a cloud account that includes both the first and second cloud service providers. When the orchestration module 308 determines the customer 102 does not have a cloud account having at least one of the provided for combinations of cloud providers, the orchestration module 308 can indicate to the customer 102 that the customer 102 cannot provision the blueprint. Alternatively, when the orchestration module 308 determines that there is a matching cloud account, it can verify that the attributes of the cloud account match the blueprint and provision the blueprint using the cloud account.

Other combinations of cloud providers may also be provided for by a blueprint. For example, the blueprint can provide a first cloud service provider capable of implementing some resources associated with the blueprint and a plurality of cloud service providers capable of implementing other resources associated with the blueprint. For example, the blueprint can provide a first plurality of cloud service providers capable of implementing some resources associated with the blueprint and a second plurality of cloud service providers capable of implementing other resources associated with the blueprint. Other combinations are possible.

In some implementations, more than one cloud account may match the requirements provided for by the blueprint. The orchestration module 308 can generate a choice of cloud accounts and permit a user to select which cloud account to use. For example, the orchestration module 308 can generate a list of cloud accounts by matching the cloud accounts against the requirements provided for by the blueprint. The orchestration module 308 can generate a data input dialog box that includes the list of cloud accounts and a selection radio button or other suitable data entry mechanism. A user associated with the customer 102 can select a cloud account to be utilized for provisioning the blueprint. The orchestration module 308 can receive the selected cloud account. The orchestration module 308 can provision the blueprint based on the cloud service provider included in the cloud account.

The system 110 can organize multiple blueprints into a blueprint chain. A blueprint chain can be generated by chaining module 306 based on input received from a user. For example, a graphical user interface can be provided to a user that permits blueprints to be dragged and dropped onto a blueprint chaining canvas, connections to be made between the resources on the blueprint canvas, and editing of attributes of resources and connections on the blueprint canvas. The chaining module 306 can retrieve the blueprint from the blueprint module 302 or from a memory used to store blueprints generated using blueprint module 302. For example, one or more blueprint design forms may be provided via the user interface. The design forms can include data input fields, drop-down box selection fields, other suitable data collection fields, or a combination thereof. The user input can include the one or more blueprints required to provision the application, attributes associated with the one or more blueprints, connection information indicating how the one or more blueprints can be connected to each other, other suitable input for generating a blueprint chain, or a combination thereof.

The ordering of blueprints in the blueprint chain can indicate an order in which the blueprints can be provisioned. In some implementations, the user input can indicate that some of the blueprints can be connected in parallel (i.e., blueprints connected in parallel can be provisioned at the same or substantially the same time) and other blueprints can be connected in series (i.e., blueprints connected in series are provisioned sequentially). The blueprints in a blueprint chain can be conditional—e.g., a blueprint chain can include two blueprints that provide network resources, but only one may be used. For example, a first network resource blueprint can use a first cloud provider and a second network resource blueprint can use a second cloud provider For example, a blueprint chain can include a storage blueprint, a network blueprint, and a compute blueprint. The storage blueprint can be provisioned in parallel with the network blueprint. Accordingly, the user can specify to connect the storage blueprint in parallel with the network blueprint. Similarly, the compute blueprint can require that the storage and network blueprints be provisioned before the compute blueprint is provisioned. The user can specify to connect the compute blueprint in series with the storage and network blueprints. In other implementations, a storage blueprint may be required to be provisioned after a network blueprint (e.g., if attributes, such as an IP address, provided by the network resource provisioning is needed in order to provision the storage blueprint).

A blueprint chain can include a deployment model and an orchestration definition, similar to that of individual blueprints. The deployment model and an orchestration definition can be generated by, for example, chaining module 306. The blueprint chain deployment model can include the selected blueprints, connection information indicating how the blueprints can be connected, other attributes associated with the blueprints, or a combination thereof. An orchestration definition can be created which indicates the provisioning order of the blueprints in the blueprint chain.

For example, a blueprint chain can include a storage blueprint, a network blueprint, and a compute blueprint. A blueprint can include a deployment model and an orchestration definition. The orchestration module 308 can determine a blueprint chain provisioning order for the blueprint chain deployment model based on the orders and attributes associated with the blueprints. The blueprint chain provisioning order can include an order in which the resources associated with the blueprints are provisioned. For example, the orchestration module 308 can be configured to combine the individual orders associated with the blueprints into a blueprint chain provisioning order. When the blueprint chain is provisioned, the orchestration module 308 can provision the blueprints according to the deployment model based on the blueprint chain provisioning order.

In some implementations, the orchestration module 308 can remove duplicate resources from resources associated with the blueprint chain (e.g., resources associated with the blueprints). The orchestration module 308 can be configured to compare resource and attributes associated with the blueprints and identify resources that match other resources associated with the blueprints. The orchestration module 308 can generate a set of blueprint chain resources. The set of blueprint chain resources can include unique resources associated with the blueprints and a single instance of resources identified as matching other resources associated with the blueprints. For example, a first blueprint can include a requirement to provision an Apache instance on a first cloud service provider, and a second blueprint can include a requirement to provision another Apache instance on the first cloud service provider. The orchestration module 308 adds a single Apache instance provisioned on the first cloud provider to the set of blueprint chain resources.

As described above, the orchestration module 308, in response to receiving a request to provision a blueprint, can be configured to determine whether the customer 102 has access to or an account with cloud service providers associated with the blueprint. In some implementations, the orchestration module 308 can be configured to determine whether the customer 102 has access to or an account with cloud service providers associated with the blueprint chain. As described above, a blueprint can provide a single cloud service provider capable of implementing resources associated with a blueprint, a first cloud service provider capable of implementing some resources associated with a blueprint and a second cloud service provider capable of implementing other resources associated with a blueprint, a plurality of cloud service providers capable of implementing resources associated with a blueprint, a first cloud service provider capable of implementing some resources associated with a blueprint and a plurality of cloud service providers capable of implementing other resources associated with the blueprint, or a combination thereof.

The orchestration module 308 can be configured to generate an orchestration used to provision the blueprint chain based on the blueprint chain orchestration definition, a selected cloud accounts, or combinations thereof. For example, the orchestration definition can include a number of alternative provisioning steps for cloud providers not included in the selected cloud account. The generation of the orchestration can include selecting the provisioning steps appropriate for the selected cloud account so that the resources of the blueprints in the blueprint chain are provisioned to the cloud providers included in the selected cloud account.

In some implementations, the system 110 can include a governance module 310. The governance module 310 can be configured to receive policies associated with the blueprints associated with the blueprint chain. For example, one or more polices may be associated with a blueprint or a blueprint chain when they are generated. There may also be default policies or other policies that may apply to the provisioning of blueprints or blueprint chains in general or to provisioning using certain cloud accounts.

Policies may include certain criteria that must be met for the policy to be satisfied. For example, a policy may include a resource quota policy. This type of policy may set a quota for the resource usage for a particular blueprint. This type of policy may be met if a comparison between the quota and the resource usage indicates that the resource usage does not exceed the quota. For example, a particular blueprint may be limited to a certain number of provisioned instances, a certain amount of memory, or a certain amount of usage. A resource quota policy may also be applied to a blueprint chain or to a cloud account, for example. In such a case the policy may apply to all resources that have been provisioned using that blueprint chain and/or cloud account.

During the orchestration of a blueprint chain, policies may be checked before the blueprint chain is provisioned, during provisioning, or a combination thereof. For example, a policy associated with the cloud account used for provisioning or the blueprint chain may be checked before provisioning occurs. For example, a policy associated with a blueprint within the blueprint chain may also be checked before provisioning of the blueprint chain begins. In order to facilitate the checking of policies associated with the blueprints of the blueprint chain, policies from the blueprints can be collected into a set of mater policies that can be de-duplicated before they are checked. Other policies, such as those that may apply to a blueprint within the blueprint chain may be checked when that particular blueprint is provisioned. If a policy fails, the provisioning of the blueprint chain may be stopped at the time the policy fails.

Various types of policies are available, such as an approval policy, a blueprint operation policy, claim policy, DNS policy, lease policy, resource operation policy, resource quota policies, other suitable policies, or a combination thereof. An approval policy can be used to require authorization from an authorized user before a blueprint is provisioned. A blueprint operation policy can be used to flexibly control whether a blueprint or blueprint chain is provisioned based on information about the user requesting the provisioning, attributes about the blueprint or blueprint chain, attributes about the cloud account, or combinations thereof. A blueprint operation policy can also obtain external data (e.g., via an external web service) pertinent to the policy. A DNS policy can be used to check and/or set the DNS host name used to provision the blueprint or blueprint chain. A resource operation policy can be used to apply policies to individual resources within a blueprint. A lease policy can be used to enforce requirements on the time period within which the blueprint or blueprint chain will be provisioned. For example, a lease policy can be used to enforce an expiration date of the provisioned blueprint or blueprint chain. The lease policy can, for example, include actions pre-expiry, at expiry, and post-expiry, such as notifications regarding expiration and invoking operations to cause the provisioned blueprint to be expired (e.g., to remove the provisioned resources associated with the provisioned blueprint).

Figure 4A:
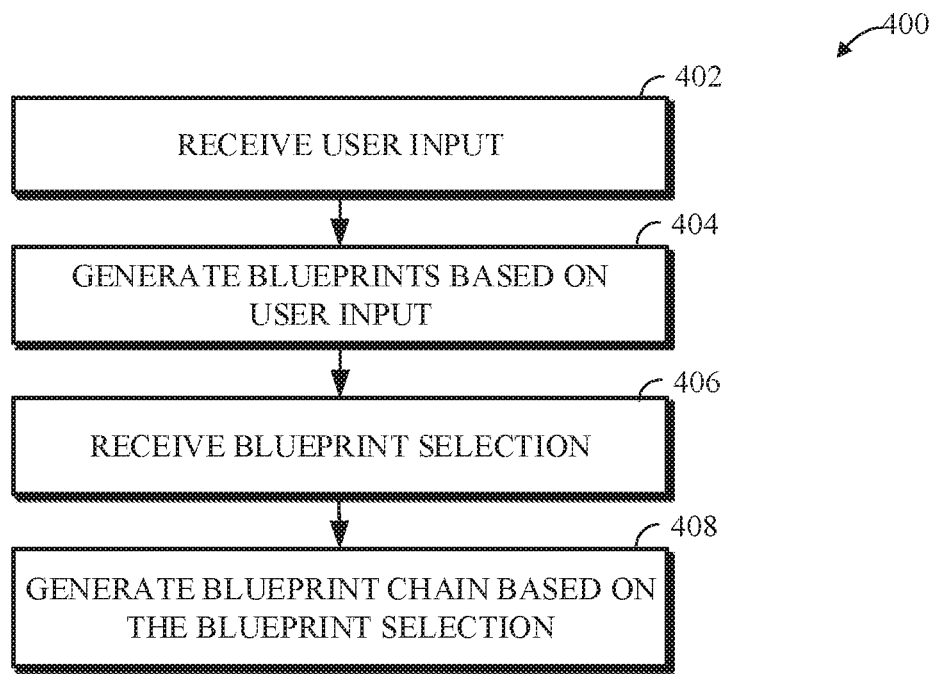
FIG. 4A is a flowchart of an example implementation of organizing blueprints into a blueprint chain.

FIG. 4A is a flowchart of an example implementation of organizing blueprints into a blueprint chain. In some implementations, technique 400 as shown in FIG. 4A can be executed using computing devices, such as the devices and modules depicted in FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other method, technique, process, or algorithm described in connection with the implementations disclosed herein can be implemented directly in hardware, firmware, software executed by hardware, circuitry, or a combination of these.

At operation 402, user input is received. For example, the blueprint module 302 can receive input via a user interface. The user input can include one or more resources required to provision the application, attributes associated with the one or more resources, connection information indicating how the one or more resources can be connected to each other, other suitable input for generating a blueprint, or a combination thereof. At 404, one or more blueprints are generated based on the user input. For example, as described above, the blueprint module 302 can be configured to generate a blueprint based on the user input.

At operation 406, one or more selected blueprints are received. For example, the chaining module 306 can receive an indication of two or more selected components from a user or customer, such as the customer 102. The chaining module 306 can be configured to generate a blueprint chain based on selected blueprints. The chaining module 306 can receive blueprint selections from a blueprint chain designer via a user interface. At operation 408, a blueprint chain is generated based on the selected blueprints by organizing the selected blueprints into a blueprint chain. For example, the chaining module 306 can be configured to organize the selected blueprints into a blueprint chain and the resulting blueprint chain can be stored in memory. The blueprint chain can include connections between the blueprints which can indicate whether blueprints in the chain can be provisioned in parallel or serially. The connections can indicate an ordering of the blueprints. For example, a first blueprint may be directionally connected to second and third blueprints. In such a case the second and third blueprints may be provisioned in parallel after the first blueprint is provisioned. As previously discussed, the individual blueprints can include resources. A blueprint can indicate which resources are permitted to be provisioned using which cloud providers.

Figure 4B:
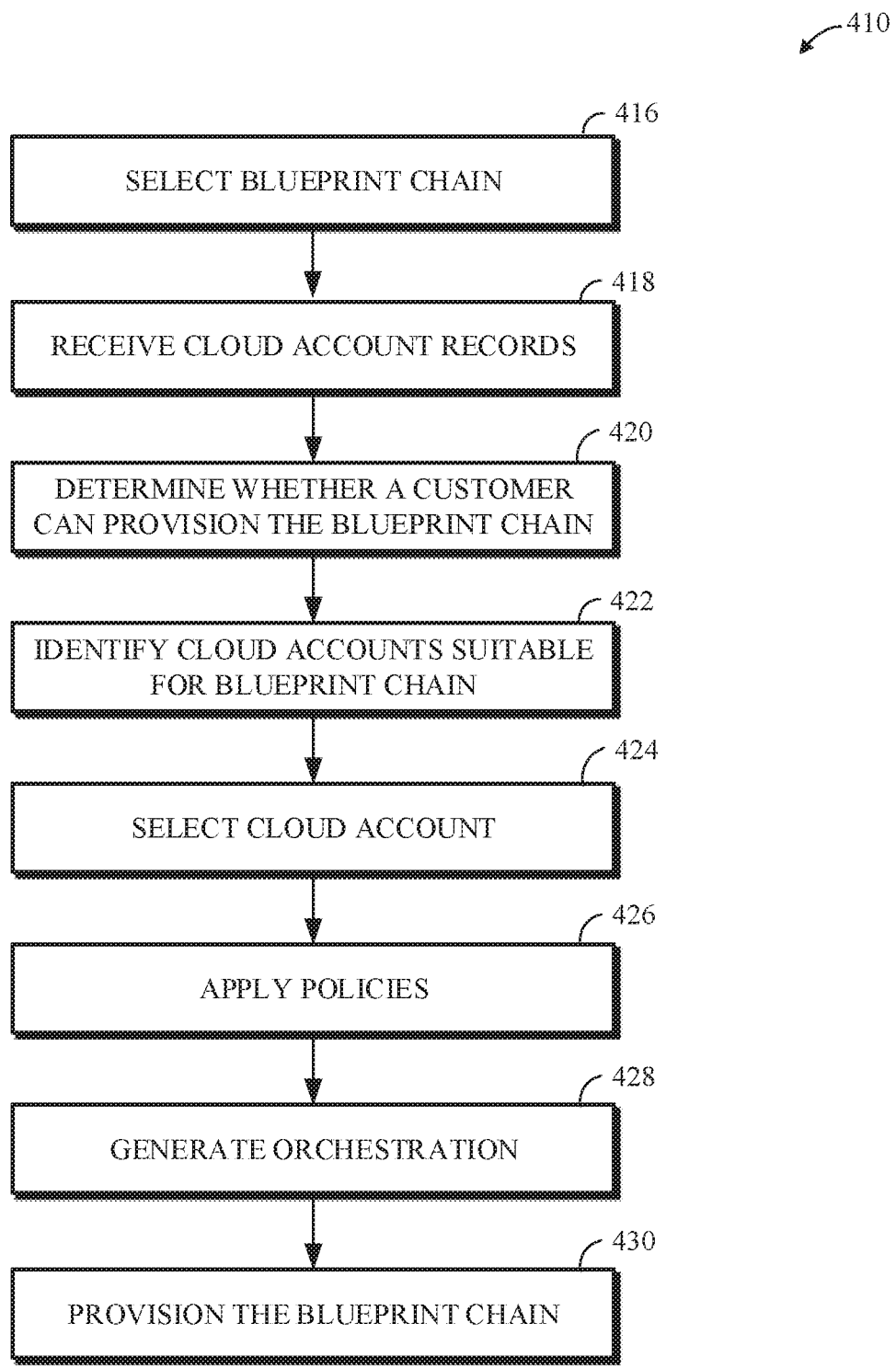
FIG. 4B is a flowchart of an example implementation of provisioning a blueprint chain using a cloud account.

FIG. 4B is a flowchart of an example implementation of provisioning a blueprint chain using a cloud account. In some implementations, technique 410 as shown in FIG. 4B can be executed using computing devices, such as the devices and modules depicted in FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other method, technique, process, or algorithm described in connection with the implementations disclosed herein can be implemented directly in hardware, firmware, software executed by hardware, circuitry, or a combination of these.

At operation 416, a blueprint chain is selected for provisioning. For example, a list of blueprint chains can be presented in a user interface to a user and a selection of a blueprint chain can be received as user input from the user using the user interface.

At operation 418, cloud account records associated with a customer, such as the customer 102, are received. As described above, the orchestration module 308 can receive the cloud account records from the user cloud account table 304.

At operation 420, a determination is made whether the blueprint chain can be provisioned using the cloud accounts associated with the customer. As described above, the orchestration module 308 can determine whether cloud service providers associated with the cloud account records match cloud service providers associated with the blueprints associated with the blueprint chain. If no cloud account records match, a determination can be made that the blueprint chain cannot be provisioned. Otherwise, a determination can be made that the blueprint chain can be provisioned. Other criteria may be used in addition to or instead of the availability of a cloud account for the selected blueprint chain.

At operation 422, a cloud accounts suitable for provisioning the blueprint chain are identified. For example, the orchestration module 308 can determine which cloud accounts have cloud providers that match the cloud providers permitted by the blueprint chain. The dialog box can include identified cloud from which the user can choose to provision the blueprint. As previously described, a cloud account can include multiple cloud providers that can be selected to provision resources included in the blueprint chain according to the cloud providers permitted for use by the blueprints, according to attributes of the blueprints and/or cloud accounts, or combinations thereof.

At operation 424, the selected cloud account is received. For example, the orchestration module 308 can be configured receive selected cloud account from the user based on user input according to a selection list in a graphical user interface.

At operation 426, policies can be applied to the selected blueprint chain. As described above, policies can be associated with the blueprint chain, blueprints in the blueprint chain, cloud accounts, or combinations thereof. The policies can be tested to determine whether they have been complied with. If a policy has not been complied with, technique 410 ends before the blueprint chain is provisioned. In such a case, an error message may be displayed to the user.

At operation 428, an orchestration is generated. For example, as described above, the orchestration module 308 can be configured to generate an orchestration including provisioning steps for provisioning the blueprint chain based on an orchestration definition of the blueprint chain. The generation of the orchestration can be based on the selected cloud account so that the provisioning steps include instructions for provisioning the resources included in the blueprint chain on the cloud providers included in the selected cloud account. The ordering of the providing steps can be based on an ordering of provisioning steps included in the orchestration definitions of individual blueprints and a provisioning ordering of an orchestration definition of the blueprint chain.

At operation 430, blueprint chain is provisioned. For example, as described above, the orchestration module 308 can be configured to provision some or all of the blueprints associated with a blueprint chain based on its deployment model, orchestration definition, and selected cloud account.

Although the techniques 400 and 410 are shown in series of operations for clarity, implementations of the technique 400 and 410 or any other method, technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, policies may be applied during the provisioning of the blueprint chain during operation 428. For example, policies may be applied immediately after a blueprint chain is selected at operation 416. For example, policies may be applied before the blueprint chain is selected (e.g., to remove blueprint chains from consideration that do not comply with one or more policies). For example, operations 402 and 404 may be omitted in the case where blueprints are already available (e.g., when blueprints are provided out of the box, or are imported from another system). For example, the list of blueprint chains can be restricted based on cloud accounts that are available for provisioning the blueprint chains. For example, operations 418 and 420 may be omitted or merged with other operations, such as operation 416 or operation 422.

Figure 5:
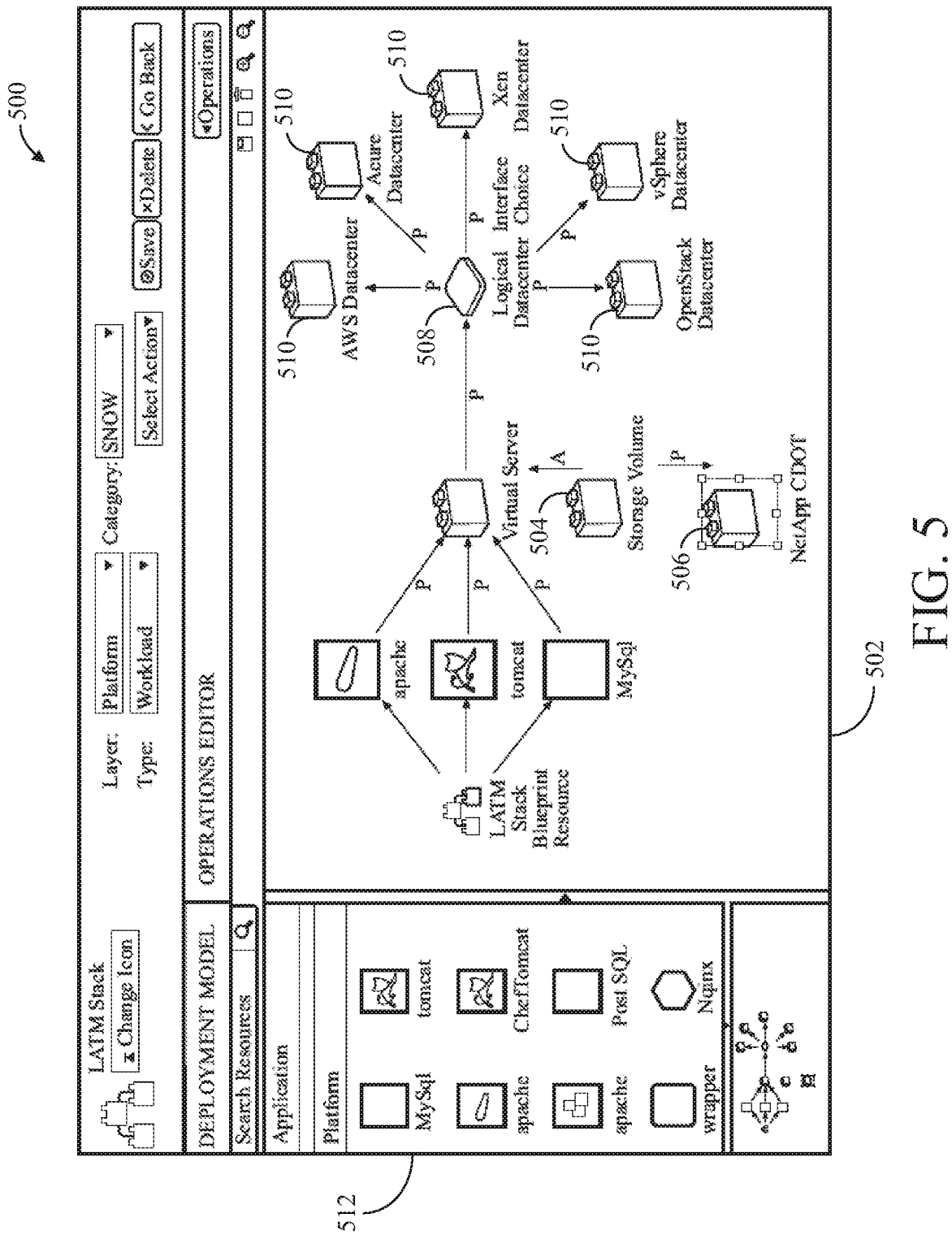
FIG. 5 is an example graphical user interface for generating a blueprint.

FIG. 5 is an example graphical user interface 500 for generating a blueprint. The graphical user interface 500 includes a blueprint canvas 502 depicting resources and connections of a blueprint. As illustrated within blueprint canvas 502, the example blueprint has resources that can be provisioned on different cloud service providers. For example, StorageVolume resource 504 can be configured to be provisioned on a NetApp cloud service provider 506, and the remainder of the illustrated resources can be configured to be provisioned on one of a plurality of selectable cloud accounts 510 using choice resource 508. A blueprint can include a number of cloud accounts 510 greater than or less than the number of cloud accounts 510 shown in FIG. 5. For example, a blueprint may permit one of only two cloud accounts to be used.

The graphical user interface 500 can also include a resource selector 512 that can include available resources for inclusion in the blueprint. The available resources can include, for example, network, storage, and compute resources provided by a cloud provider. The available resources can include additional resources, such as software that can be provisioned onto cloud computing resources, such as web server software, database server software, or application server software. A resource can also include a blueprint that has already been created.

The connections between resources in the blueprint can indicate a type of connection. For example, a connection (shown as a line with an arrow) with a "P" can indicate a provisioning connection, which can indicate the cloud provider or cloud computing resource on which a resource is to be provisioned. For example, software can be provisioned on a virtual server computing resource and cloud computing resources can be provisioned using one or more cloud computing providers. A connection with an "A" can indicate that a resource is to be applied to another resource. For example, a storage volume can be applied to a virtual server.

Figure 6:
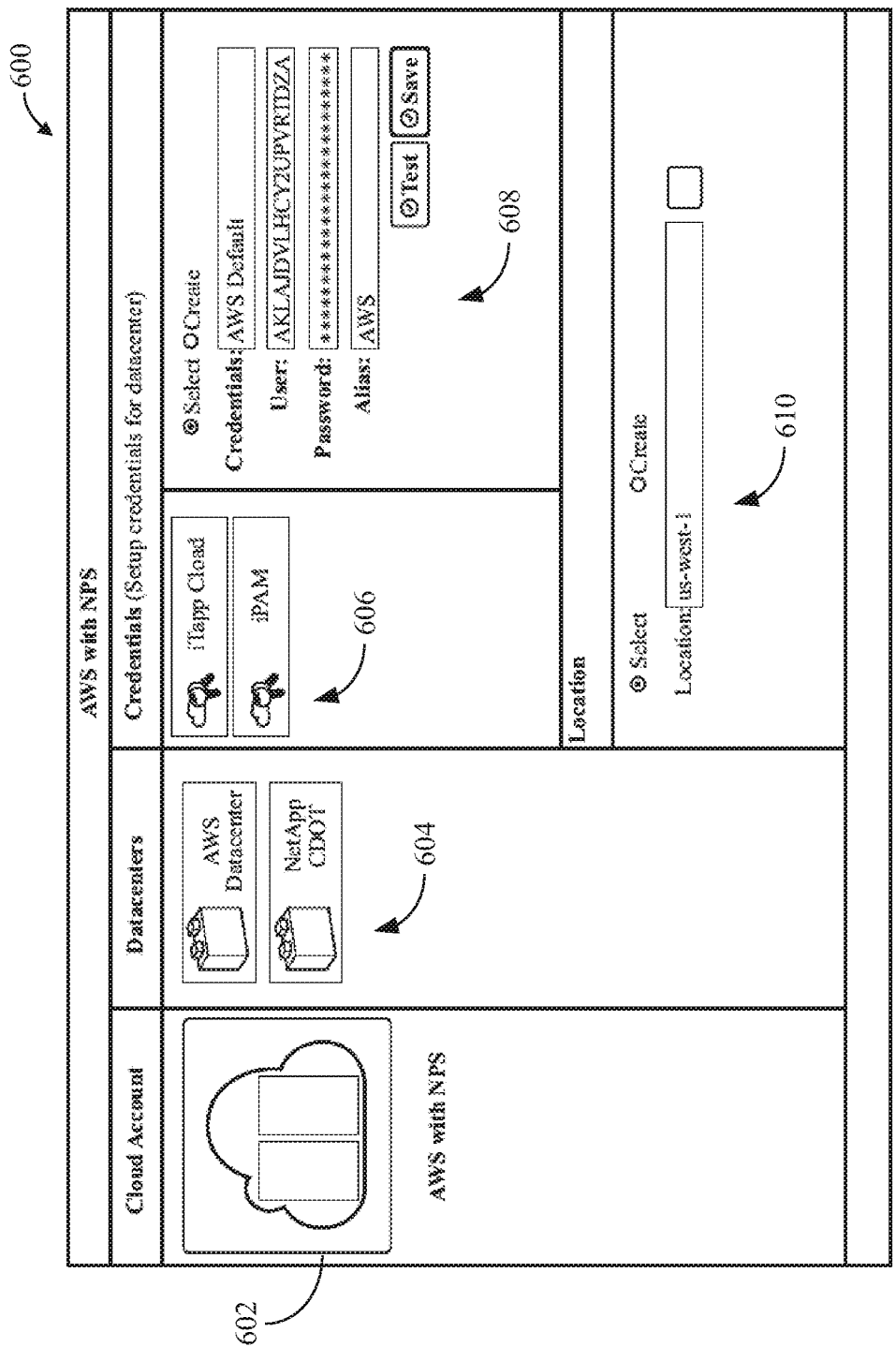
FIG. 6 is an example graphical user interface for viewing, creating, or editing a cloud account.

FIG. 6 is an example graphical user interface 600 for viewing, creating, or editing a cloud account 602. A cloud account can include one or more cloud service providers 604 that can be utilized in order to provision resources of a blueprint or a blueprint chain. The cloud account can also include metadata or other information defining how the cloud service providers in the cloud account are interrelated or how they interoperate. For example, each cloud service provider can have one or more associated credentials 606 that include login information 608 for a cloud service provider. A cloud service provider can also have attribute information include location information 610.

Figure 7:
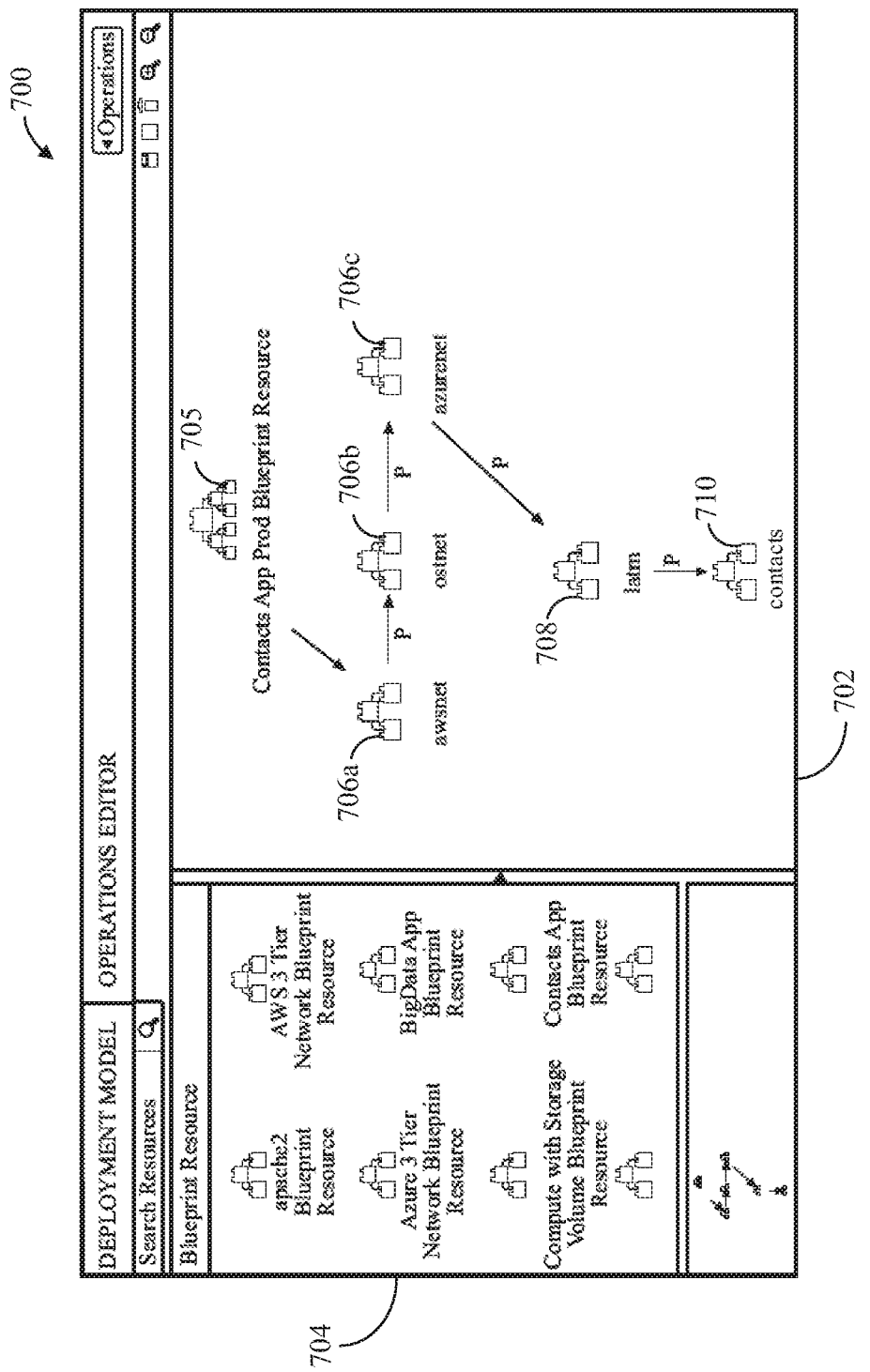
FIG. 7 is an example graphical user interface for generating a blueprint chain.

FIG. 7 is an example graphical user interface 700 for generating a blueprint chain. The graphical user interface 700 includes a blueprint chain canvas 702 depicting blueprints and connections of a blueprint chain. The graphical user interface 700 includes a blueprint selector 704 that can include blueprints available for inclusion in the blueprint chain.

In the example blueprint chain shown, a root blueprint chain node 705 is shown that connects to five blueprints includes in the blueprint chain, including three network blueprints 706a-c, one "latm" blueprint 708 providing web, application, and database servers, and one "contacts" blueprint 710 providing a contact application. The blueprints are shown connected in order based on the dependencies of the blueprints (e.g., the contacts blueprint may depend on the latm blueprint and the latm blueprint may depend on the network blueprints). As an example, the three network blueprints can include network resources that are provisioned on a selected cloud provider (i.e., a cloud service provider included in a selected cloud account). In this example, three network blueprints are provided that each use a different cloud service provider. When the blueprint chain is provisioned the cloud account may provide for the use of one of the three network cloud service providers which may cause one of the network blueprints to be provisioned and the remaining network blueprints to be skipped.

Figure 8:
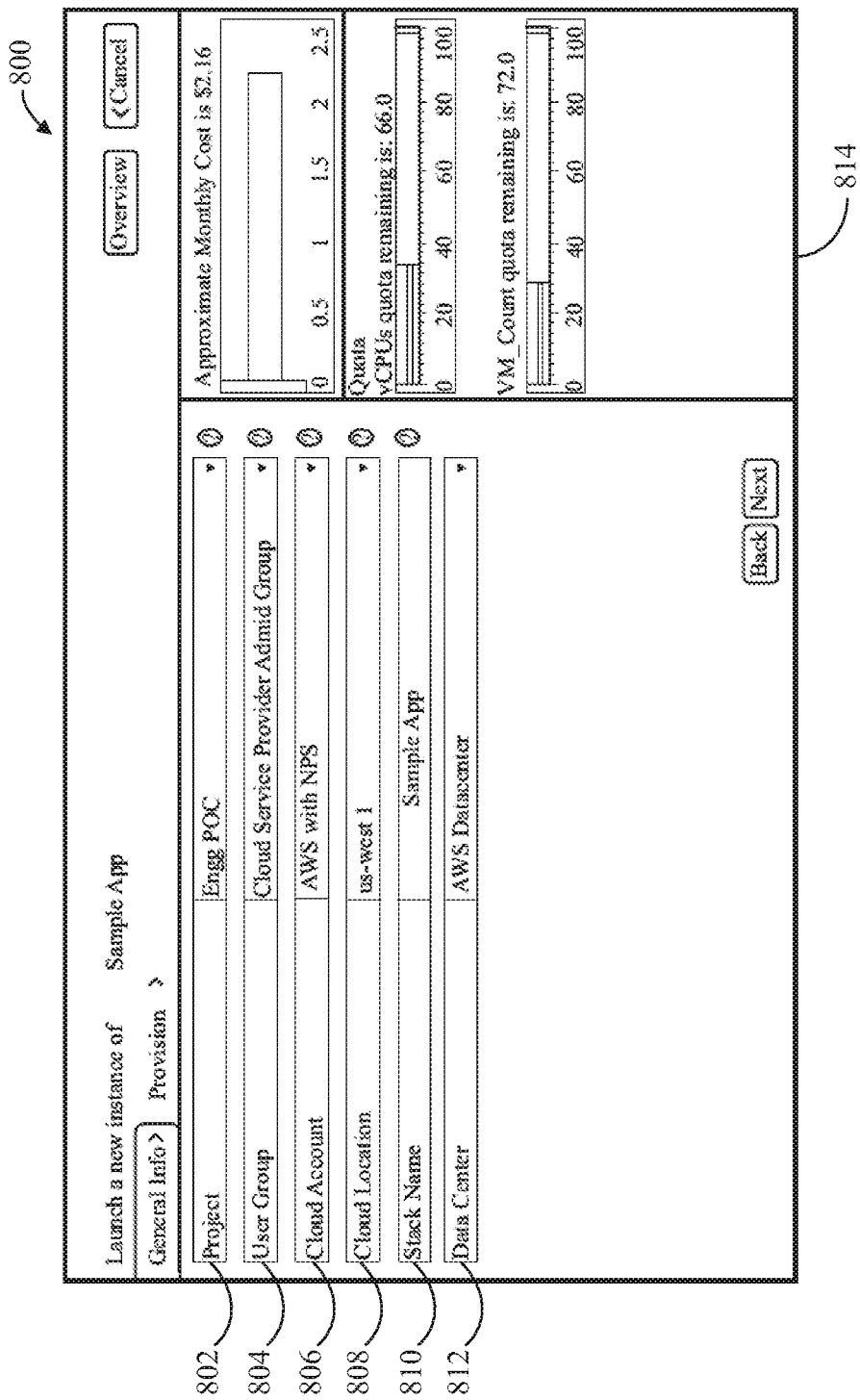
FIG. 8 is an example graphical user interface usable to select a blueprint chain for provisioning.

FIG. 8 is an example graphical user interface 800 usable to select a blueprint chain for provisioning. Graphical user interface 800 can be used to collect user input from a user needed to provision a blueprint chain. For example, the user input can include a project name 802, a user group 804, a cloud account 806, a cloud location 808, a stack name 810, and a data center name 812. For example, the stack name 810 can indicate the selection of the blueprint chain that is to be provisioned. For example, the cloud account 806 can indicate the selection of the cloud account that is to be used for provisioning the selected blueprint chain. In some implementations, the cloud accounts available for selection using cloud account 806 can be determined based on the cloud providers permitted by the blueprint chain selected using stack name 810. Alternatively, the blueprint chains available for selection using stack name 810 can be determined based on the cloud account 806 and the cloud location 808 (the available locations can be defined, for example, using graphical user interface 600).

In some implementations, the screen can collect information that is different from that shown in example graphical user interface 800. For example, in a case where only a single cloud location or a single blueprint chain is available for a cloud account 806, the information for cloud location 808 and stack name 810 may be automatically selected. The graphical user interface 800 can also include an approximate monthly cost associated with provisioning the blueprint chain and one or more quota indicators 814. The quota indicators may be associated with one or more policies associated with the selected cloud account or blueprint chain. In the depicted example, a vCPU quota widget displays an estimated vCPU usage available for provisioning the blueprint chain, and a $VM_{13}Count$ widget displays an estimated number of virtual machines available for provisioning the blueprint chain. The graphical user interface 800 can include additional, less or different information than depicted.

All or a portion of the aspects of the systems and techniques described herein can be implemented using a general purpose computer/processor with a computer program that, when executed, carries out any of the respective techniques, algorithms, or instructions described herein. In addition, or alternatively, for example, a special-purpose computer/processor can be utilized, which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array, such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The embodiments herein can be described in terms of functional block components and various processing operations. Such functional block components can be realized by any number of hardware or software components that perform the specified functions. For example, the described embodiments can employ various integrated circuit components, e.g., memory elements, processing elements, logic elements, look-up tables, and the like, which can carry out a variety of functions under the control of one or more microprocessors or other control devices. Similarly, where the elements of the described embodiments are implemented using software programming or software elements, the systems and techniques can be implemented with any programming or scripting language such as C, C++, Java, assembler, or the like, with the various algorithms being implemented with a combination of data structures, objects, processes, routines, or other programming elements. Functional aspects can be implemented in algorithms that execute on one or more processors. Furthermore, the embodiments of the systems and techniques could employ any number of conventional techniques for electronics configuration, signal processing or control, data processing, and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise; or clearly indicated otherwise by the context to be directed to a singular form. Moreover, use of the term "an implementation" or the term "one implementation" throughout this disclosure is not intended to mean the same embodiment or implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, unless otherwise indicated, no item or component has to be included in order to practice the systems and techniques described herein.

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a," "an," and "the," and similar referents in the context of describing the systems and techniques (especially in the context of the following claims) should be construed to cover both the singular and the plural. Furthermore, unless otherwise indicated herein, the recitation of ranges of values herein is merely intended to serve as a shorthand alternative to referring individually to each separate value falling within the range, and each separate value is incorporated into the specification as if it were individually recited herein. Finally, the operations of all techniques described herein are performable in any suitable order unless otherwise indicated herein or clearly indicated otherwise by the context. The use of any and all examples, or exemplary language (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for provisioning resources in a distributed computing system, the method comprising:
    organizing a plurality of blueprints into a blueprint chain stored in computer-readable memory, the blueprint chain connecting each blueprint of the plurality of blueprints in an order, wherein each blueprint in the blueprint chain defines connections between each resource in each blueprint to form a schematic of a portion of an application, wherein a first resource of a first blueprint of the plurality of blueprints is associated with a first provider and a second resource of a second blueprint of the plurality of blueprints is associated with a second provider;
    identifying a cloud account suitable for provisioning the blueprint chain from a plurality of cloud accounts associated with the first provider, the second provider, or both, wherein the cloud account is suitable based on an association of the cloud account with both the first provider and the second provider; and
    generating, using a processor connected to the computer-readable memory, an orchestration to provision an instance of the application, the orchestration including a plurality of provisioning steps based on the blueprint chain and the identified cloud account, wherein an ordering of the plurality of provisioning steps depends on the order of the blueprints in the blueprint chain.

2. The method of claim 1, comprising:
    provisioning the instance of the application by executing the plurality provisioning steps in the orchestration according to the ordering.

3. The method of claim 2, wherein the instance of the application includes resources provisioned using the first provider and the second provider.

4. The method of claim 2, wherein the provisioning of the instance of the application includes:
    sending instructions to the first provider to provision the first resource of the blueprint chain; and
    sending instructions to the second provider to provision the second resource of the blueprint chain.

5. The method of claim 4, wherein the blueprint includes attributes usable for provisioning the first and second resources.

6. The method of claim 4, wherein the identified cloud account includes attributes usable for provisioning the first resource using the first provider and provisioning the second resource using the second provider.

7. The method of claim 1, comprising:
    receiving a policy associated with the plurality of blueprints; and
    permitting the blueprint chain to be provisioned based on a determination that the policy is met.

8. The method of claim 7, wherein the policy is a quota policy and the determination that the policy is met is based on a comparison between a quota and a resource usage of one of the first provider and the second provider.

9. The method of claim 1, wherein the first blueprint of the blueprint chain is generated based on user input received from a first user and wherein the second blueprint of the blueprint chain is generated based on user input received from a second user.

10. The method of claim 1, wherein identifying the cloud account includes comparing cloud providers of a plurality of cloud accounts with cloud providers permitted by the blueprint chain.

11. The method of claim 1, comprising:
    selecting the blueprint chain from a plurality of blueprint chains based on user input.

12. A system for provisioning resources in a distributed computing system, the system comprising:
    a processor and a memory, the memory including instructions executable by the processor to:
        organize a plurality of blueprints into a blueprint chain in an order, wherein each blueprint in the blueprint chain defines connections between each resource in each blueprint to form a schematic of a portion of an application, wherein a first resource of a first blueprint is associated with a first provider and a second resource of a second blueprint is associated with a second provider;
        identify a cloud account suitable for provisioning the blueprint chain from a plurality of cloud accounts associated with the first provider, the second provider, or both, wherein the cloud account is suitable based on an association of the cloud account with both the first provider and the second provider; and
        generate an orchestration to provision an instance of the application, the orchestration including a plurality of provisioning steps based on the blueprint chain and the identified cloud account, wherein an ordering of the plurality of provisioning steps depends on the order of the blueprints in the blueprint chain.

13. The system of claim 12, wherein the memory includes instructions executable by the processor to:
    provision the instance of the application by executing the plurality of provisioning steps according to the ordering.

14. The system of claim 13, wherein the memory includes instructions executable by the processor to:
    send instructions to the first provider to provision the first resource; and
    send instructions to the second provider to provision the second resource.

15. The system of claim 12, wherein the memory includes instructions executable by the processor to:
    receive a policy associated with the plurality of blueprints; and
    permit the blueprint chain to be provisioned based on a determination that the policy is met.

16. The system of claim 12, wherein the instructions to identify the cloud account includes instructions to compare cloud providers of a plurality of cloud accounts with cloud providers permitted by the blueprint chain.

17. The system of claim 12, wherein the memory includes instructions executable by the processor to:
  select the blueprint chain from a plurality of blueprint chains based on user input.

18. A non-transitory computer-readable storage medium comprising executable instructions that, when executed by a processor, facilitate performance of operations, comprising:
  organizing a plurality of blueprints into a blueprint chain stored in computer-readable memory, the blueprint chain connecting the blueprints in an order, wherein each blueprint in the blueprint chain defines connections between each resource in each blueprint to form a schematic of a portion of an application, wherein a first resource of a first blueprint is associated with a first provider and a second resource of a second blueprint is associated with a second provider;
  identifying a cloud account suitable for provisioning the blueprint chain from a plurality of cloud accounts associated with the first provider, the second provider, or both, wherein the cloud account is suitable based on an association of the cloud account with both the first provider and the second provider; and
  generating, using a processor connected to the computer-readable memory, an orchestration to provision an instance of the application, the orchestration including a plurality of provisioning steps based on the blueprint chain and the identified cloud account, wherein an ordering of the plurality of provisioning steps depends on the order of the blueprints in the blueprint chain.

19. The non-transitory computer-readable storage medium of claim 18, wherein the operations further comprise:
  provisioning the instance of the application by executing the provisioning steps in the orchestration.

20. The non-transitory computer-readable storage medium of claim 18, wherein the operations further comprise:
  sending instructions to the first provider to provision the first resource of the blueprint chain; and
  sending instructions to the second provider to provision the second resource of the blueprint chain.

* * * * *